United States Patent
Uenishi et al.

(10) Patent No.: US 11,281,187 B2
(45) Date of Patent: Mar. 22, 2022

(54) NUMERICAL CONTROLLER

(71) Applicant: FANUC CORPORATION, Yamanashi (JP)

(72) Inventors: Daisuke Uenishi, Yamanashi (JP); Chikara Tango, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 349 days.

(21) Appl. No.: 16/660,710

(22) Filed: Oct. 22, 2019

(65) Prior Publication Data
US 2020/0133240 A1    Apr. 30, 2020

(30) Foreign Application Priority Data
Oct. 31, 2018 (JP) .............................. JP2018-205701

(51) Int. Cl.
*G05B 19/4155* (2006.01)
*G05B 19/416* (2006.01)
*G05B 19/414* (2006.01)

(52) U.S. Cl.
CPC ....... *G05B 19/4155* (2013.01); *G05B 19/416* (2013.01); *G05B 19/4142* (2013.01); *G05B 2219/42173* (2013.01); *G05B 2219/43009* (2013.01)

(58) Field of Classification Search
None
See application file for complete search history.

(56) References Cited

U.S. PATENT DOCUMENTS

| 2008/0294877 | A1* | 11/2008 | Haga | G05B 19/4155 |
| | | | | 712/216 |
| 2017/0329305 | A1* | 11/2017 | Shindou | G05B 19/408 |
| 2017/0364054 | A1* | 12/2017 | Kubota | G05B 19/408 |

FOREIGN PATENT DOCUMENTS

JP    3723015 B2    12/2005

* cited by examiner

*Primary Examiner* — Ryan A Jarrett
(74) *Attorney, Agent, or Firm* — Studebaker & Brackett PC

(57) ABSTRACT

To provide a numerical controller that can detect a position in a machining program at which a speed control abnormality is likely to occur due to an insufficient look-ahead blocks that are used to determine an acceleration/deceleration operation, and supplement the look-ahead blocks at that position in order to stabilize feed rate, cutting speed and other factors. A numerical controller includes a required look-ahead blocks setting unit that sets a required look-ahead blocks, which is a look-ahead blocks required to execute a machining program, and an operation limitation unit that compares a look-ahead blocks calculated by a look-ahead blocks calculation unit to the required look-ahead blocks and, if the look-ahead blocks is less than the required look-ahead blocks, limits execution of the machining program until the look-ahead blocks reach the required look-ahead blocks.

8 Claims, 9 Drawing Sheets

FIG. 4

EXEMPLARY PROGRAM

```
O1000
...
...
M400
1 BLADE SURFACE MACHINING PATH
M400
2 BLADE SURFACE MACHINING PATH
M400
3 BLADE SURFACE MACHINING PATH
...
...
...
```

NUMERICAL CONTROLLER

This application is based on and claims the benefit of priority from Japanese Patent Application No. 2018-205701, filed on 31 Oct. 2018, the content of which is incorporated herein by reference.

BACKGROUND OF THE INVENTION

Field of the Invention

The present invention relates to a numerical controller.

Related Art

In the manufacturing industry today, IT parts and other devices are being manufactured on smaller scales and with higher precision, and interest in high-speed and high-precision machining is on the rise.

In order to achieve even higher quality in machining, there has been an increase in the number of workpiece machining programs for high-speed and high-precision machining that are created with tolerances on smaller orders.

Conventionally, machining programs with small tolerances could not realistically be used due to low computer processing power. However, in recent years, both computer performance and computer aided manufacturing (CAM) performance have improved to the point where machining programs with small tolerances can now be easily created, and this trend is expected to grow in years to come One aspect other than tolerance that is important when producing high-quality machining is uniformizing minute straight lines. Machining quality is increased when vibration is reduced through stabilizing acceleration/deceleration at each axle. As a result, there has been an increase in the number of high-quality machining programs featuring even minute straight lines.

Therefore, machining programs are now made up of more blocks.

In the prior art, a numerical controller looks ahead at programs and reads out and processes a program for blocks to be executed next according to the first in, first out (FIFO) method from a number of programs stored in advance equal to look-ahead blocks. Then, the numerical controller determines an acceleration/deceleration operation and performs axis control.

However, such high-quality machining programs have the following problem.

That is, the programs have short minute straight lines and fast command speed which means that, if the processing time for executing the program is shorter than the time required for look-ahead processing, the look-ahead blocks used to determine the acceleration/deceleration operation cannot be secured. As a result, acceleration/deceleration is not determined in consideration of program behavior and changes in speed are not constant and high-quality machining cannot be achieved.

FIG. 8 is a graph showing the difference in acceleration/deceleration over time when change in speed is unstable.

As illustrated in FIG. 8, speed initially moves stably at a command speed of 6,000 mm/min. At 2,000 mm/min, there was insufficient processing time for executing the program and the look-ahead blocks used to determine the acceleration/deceleration operation could not be secured. Therefore, speed became unstable and moved slightly as indicated by the arrows in FIG. 8.

Such behavior is particularly significant when a machine tool has a large number of axes, such as in 5-axis machining, and the processing power of the numerical controller is decreased. These problems can be solved by increasing the processing power of the numerical controller used for looking ahead or executing machining programs. However, similar problems occur when command speed is further increased by making programs more detailed or updating machines.

In particular, one example of a detailed machining program is machining for impeller machining, which is a type of simultaneous 5-axis machining that is used for high-speed and high-quality machining.

FIG. 9 illustrates an impeller 80 as an example of an impeller.

When the impeller 80 is machined, the hub surface 81 and the fillet surface 82 need to be finished by machining at a fast feed rate while using short minute straight lines. In addition, this machining employs a smoothing function that places more processing load on the CPU.

As shown in FIG. 10 which illustrates an example of impeller machining, particularly when machining blades such as the main blade (long blade) 83 and the splitter blade (short blade) 84, the look-ahead blocks at the start of machining or partway through machining may become zero and speed control may become unstable.

In order to provide a solution to these problems, the invention described in Patent Document 1 discloses a technology in which a numerical controller monitors the amount of data in a buffer that is held by the FIFO method until analysis data consisting of analyzed NC data is used as acceleration/deceleration interpolation means. In particular, the technology determines that there is insufficient data when the amount of data predicted to exist in the buffer falls below a lower limit threshold value.

Patent Document 1: Japanese Patent No. 3723015

SUMMARY OF THE INVENTION

However, the technology disclosed in Patent Document 1 only increases the priority of the NC data analysis processing task when it is determined that there is insufficient data and does not determine what data in the NC data is insufficient or at which position there is insufficient data, and is therefore unable to deal with speed control abnormalities at places where data is insufficient.

It is an object of the present invention to provide a numerical controller that can detect a position in a machining program at which a speed control abnormality is likely to occur due to an insufficient look-ahead blocks that are used to determine an acceleration/deceleration operation, and supplement the look-ahead blocks at that position in order to stabilize feed rate, cutting speed and other factors.

(1) A numerical controller according to the present invention is a numerical controller (for example, a "numerical controller 100" to be described later) for controlling a machine tool (for example, a "machine tool 200" to be described later) that has axes by executing a machining program that is made up of a plurality of blocks and controls acceleration/deceleration of the axes, the numerical controller including: a program execution unit (for example, a "program execution unit 111" to be described later) that executes the machining program; a program look-ahead unit (for example, a "program look-ahead unit 112" to be described later) that looks ahead at the machining program in parallel with execution of the machining program; a look-ahead blocks calculation unit (for example, a "look-ahead blocks calculation unit 113" to be described later) that calculates a look-ahead blocks, which is the difference between a first sequence number that is the number of a block being executed by the program execution unit and a second sequence number that is the number of a block that is looked ahead by the program look-ahead unit while the machining program is being executed; a required look-ahead blocks setting unit (for example, a "required look-ahead blocks setting unit 114" to be described later) that sets a required look-ahead blocks, which is the look-ahead blocks required to execute the machining program; and an operation limitation unit (for example, an "operation limitation unit 116" to be described later) that compares the look-ahead blocks calculated by the look-ahead blocks calculation unit and the required look-ahead blocks and, if the look-ahead blocks is less than the required look-ahead blocks, limits execution of the machining program by the program execution unit until the look-ahead blocks reaches the required look-ahead blocks.

(2) The numerical controller described in Item (1) may further include a storage unit (for example, a "RAM 13" to be described later) that stores blocks that are looked ahead by the program look-ahead unit, where the stored blocks are consumed by executing the program, in which the required look-ahead blocks setting unit may set the required look-ahead blocks on the basis of maximum capacity of the storage unit.

(3) The numerical controller described in Item (1) may further include a storage unit that stores the required look-ahead blocks, in which the required look-ahead blocks setting unit may set the required look-ahead blocks using the required look-ahead blocks stored in the storage unit.

(4) In the numerical controller described in Item (1), the required look-ahead blocks setting unit may set the required look-ahead blocks on the basis of a variable that is written in the machining program together with a predetermined first code.

(5) In the numerical controller described in Item (1), the machining program may contain an iteration of a second code that corresponds to identical machining, the numerical controller may further include a storage unit that stores a number of consumed blocks that is the look-ahead blocks consumed when the second code was previously executed by the program execution unit, and the required look-ahead blocks setting unit may set, as the required look-ahead blocks, a value in which the number of consumed blocks is added to the look-ahead blocks before the code is executed when the code is executed next or for subsequent times by the program execution unit.

(6) In the numerical controller described in any one of Items (1) to (5), the operation limitation unit may instruct the program execution unit to stop executing the machining program.

(7) In the numerical controller described in any one of Items (1) to (5), the operation limitation unit may reduce operation speed of the machine tool specified in the machining program.

(8) The numerical controller described in any of the Items (1) to (7) may further include a supplement code addition unit that detects a block in the machining program at which the look-ahead blocks calculated by the look-ahead blocks calculation unit falls below a prescribed value when a simulation of the machining program is executed, and inserts a predetermined third code is the block, and, when the third code is detected, the operation limitation unit may compare the look-ahead blocks and the required look-ahead blocks.

According to the present invention, it is possible to detect a position in a machining program at which a speed control abnormality is likely to occur due to an insufficient look-ahead blocks that are used to determine an acceleration/deceleration operation, and supplement the look-ahead blocks at that position in order to stabilize feed rate, cutting speed and other factors.

BRIEF DESCRIPTION OF THE DRAWINGS

FIG. 4 is a diagram for illustrating an exemplary machining program that is used in the embodiment of the present invention.

DETAILED DESCRIPTION OF THE INVENTION

Now, an embodiment of the present invention is described with reference to FIGS. 1 to 7.

1. Outline of Invention

A look-ahead blocks becomes zero when the position of a block to be looked ahead or the position of a block to be executed by a program execution unit reaches the end of a machining program.

However, the look-ahead blocks usually does not evenly decrease to zero. The rate reduction of look-ahead blocks changes depending on the processing time for each block, which differs due to a change in the curvature of the machining path or the axis configuration.

For example, at a portion in the machining program where minute straight lines are continuous with each other, the execution speed of the machining program becomes slower and the processing time of each block becomes shorter. When this happens, the look-ahead blocks decrease at a higher rate of reduction.

In this case, the look-ahead blocks that are used to determine the acceleration/deceleration operation cannot be secured and a speed control abnormality occurs in which change in speed is no longer constant.

As a result, in this embodiment, the actual look-ahead blocks is compared with a required look-ahead blocks. If the actual look-ahead blocks is insufficient, operation speed of the machine tool becomes slower and execution of the machining may stop at a block at which a speed control abnormality is expected to likely occur.

During this time, the machining program continues to be looked ahead and the look-ahead blocks is supplemented. With this configuration, the required look-ahead blocks can be secured and a speed control abnormality is less likely to occur.

2. Configuration of Invention

Figure 1:
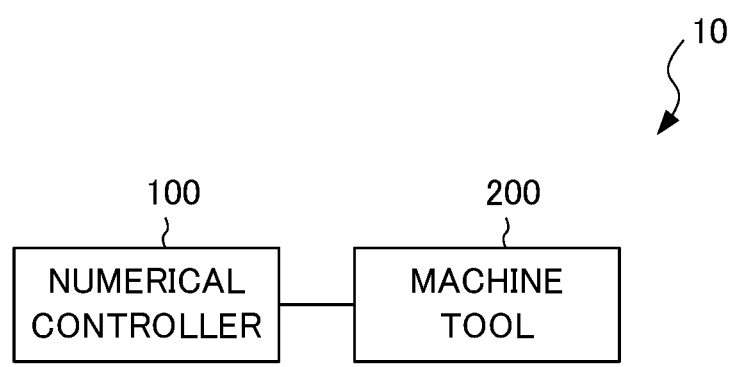
FIG. 1 is a diagram for illustrating the configuration of a control system including a numerical controller according to a first embodiment of the present invention.

FIG. 1 illustrates the configuration of a control system 10 that includes a numerical controller 100 according to a first embodiment of the present invention and a machine tool 200 that is controlled by the numerical controller 100.

The numerical controller 100 is a machine that outputs an operation command to the machine tool 200 to numerically control the machine tool 200 using functions to be described later.

A detailed description of the configuration and functions of the numerical controller 100 is provided later.

The machine tool 200 is a device that performs predetermined machining such as cutting.

The machine tool 200 includes a motor that is driven to machine workpiece and a spindle and a feed axis that are attached to the motor. The machine tool 200 also includes fixtures and tools that correspond to the respective axes. The motor of the machine tool 200 is driven on the basis of an operation command that is output from the numerical controller 100 such that the machine tool 200 performs predetermined machining.

Herein, the contents of the predetermined machining are not particularly limited and types of machining other than cutting, such as grinding, polishing, rolling or forging, may also be employed.

Figure 2:
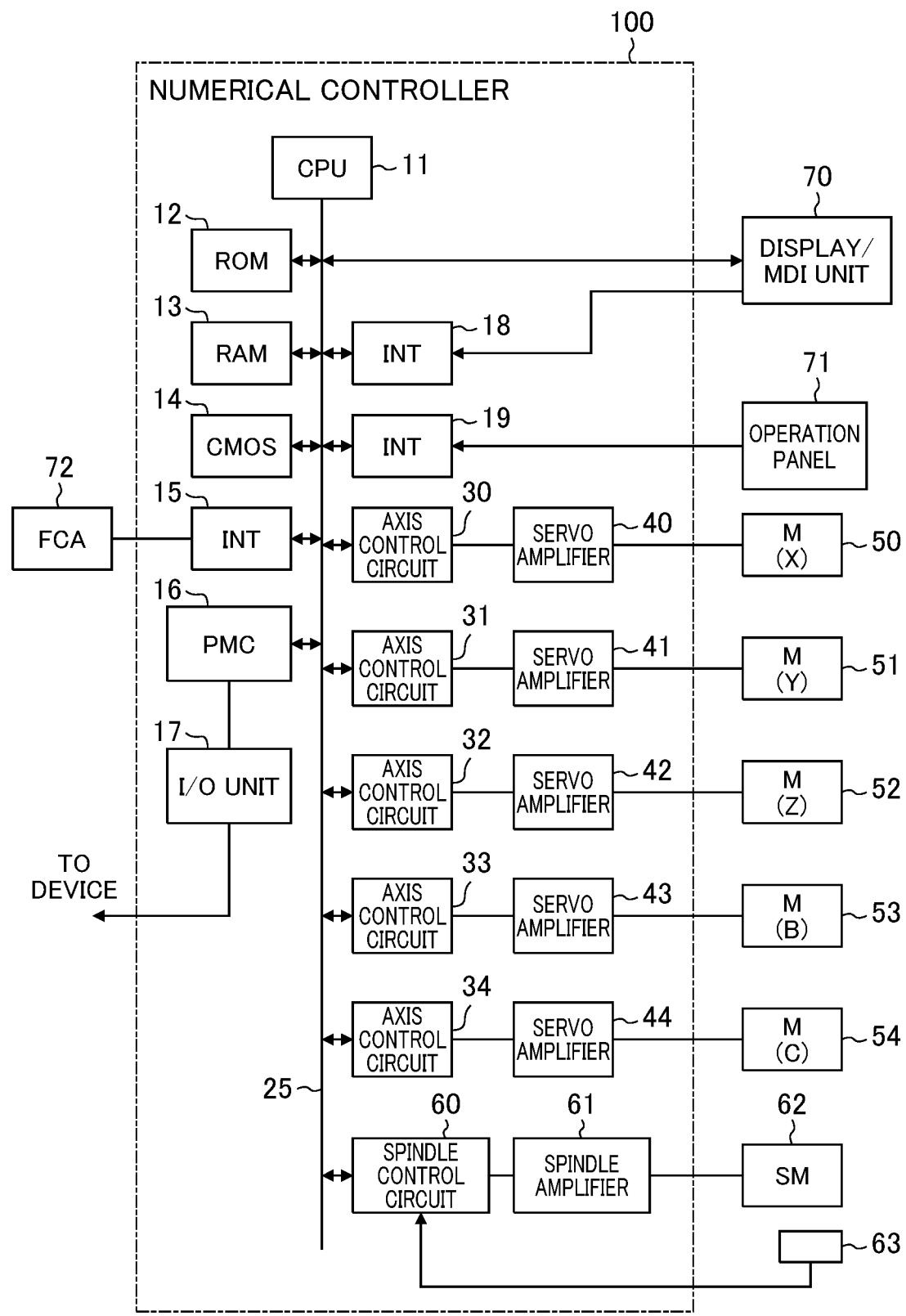
FIG. 2 is a diagram for illustrating the configuration of the numerical controller according to the embodiment of the present invention.

FIG. 2 illustrates an exemplary configuration of the numerical controller 100 according to the embodiment of the present invention.

The numerical controller 100 primarily includes a CPU 11, a ROM 12, a RAM 13, a CMOS 14, interfaces 15, 18 and 19, a programmable machine controller (PMC) 16, an I/O unit 17, axis control circuits 30 to 34, servo amplifiers 40 to 44, a spindle control circuit 60, and a spindle amplifier 61.

The CPU 11 is a processor that controls the entire numerical controller 100.

The CPU 11 reads out a system program that is stored in the ROM 12 via a bus 25 and controls the entire numerical controller 100 according to the system program.

The RAM 13 stores temporary calculation data and display data and various types of data that is input by an operator using a display/MDI unit 70.

The CMOS memory 14 is a non-volatile memory that is backed up by a battery (not shown) and that retains its storage state even when power to the numerical controller 100 is turned off. The CMOS memory 14 stores a machining program that was read to the CMOS memory 14 via the interface 15, a machining program that was input to the CMOS memory 14 via the display/MDI unit 70, and other data.

The ROM 12 is pre-written with various types of system programs for executing processing for an edit mode required to create and edit machining programs and processing for automatic operation.

Various types of machining programs such as the machining programs for implementing the present invention can be input using the interface 15 or the display/MDI unit 70 and stored in the CMOS memory 14.

The interface 15 can connect the numerical controller 100 to an external device 72 such as an adaptor.

Machining programs, various parameters and other data are read from the external device 72 side.

Machining programs that are edited within the numerical controller 100 can be stored in external storage means using the external device 72.

The programmable machine controller (PMC) 16 outputs signals via the I/O unit 17 to an auxiliary device (for example, an actuator in the form of a robot hand used for replacing tools) for a machine tool using a sequence program stored in the numerical controller 100 and controls the device.

The PMC 16 receives signals such as those for various switches on an operation panel provided in the body of the machine tool, and transmits those signals to the CPU 11 after executing required signal processing.

The display/MDI unit 70 is a manual data input device that includes components such as a display and a keyboard. The interface 18 receives commands and data from a keyboard in the display/MDI unit 70 and transfers those commands and data to the CPU 11.

The interface 19 is connected to an operation panel 71. The operation panel 71 includes a manual pulse generator.

The axis control circuits 30 to 34 for each axis receive movement command amounts for each axis from the CPU 11 and output the commands for each axis to the servo amplifiers 40 to 44.

The servo amplifiers 40 to 44 receive these commands and drive servo motors 50 to 54 for each axis.

Each servo motor 50 to 54 for each axis includes a position/speed detector. The position/speed detectors output position/speed feedback signals that are fed back to each axis control circuit 30 to 31 to perform feedback control for position/speed.

Note that this position/speed feedback is omitted from the block diagrams.

The spindle control circuit 60 receives a spindle rotation command for the machine tool and outputs a spindle speed signal to the spindle amplifier 61.

The spindle amplifier 61 receives the spindle speed signal and rotates the spindle motor 62 of the machine tool at the commanded rotational speed to drive the tool.

The spindle motor 62 is connected to a pulse encoder 63 by a gear, a belt, or another component.

The pulse encoder 63 outputs a feedback pulse in synchronization with rotation of the spindle.

The feedback pulse is read by the CPU 11 via the bus 25.

In the exemplary configuration of the numerical controller 100 illustrated in FIG. 2, five axis control circuits (axis control circuits 30 to 34) and five servo motors (servo motors 50 to 54) are illustrated.

However, the present invention is not limited to this configuration and any number of axis control circuits and servo motors may be provided.

Figure 3:
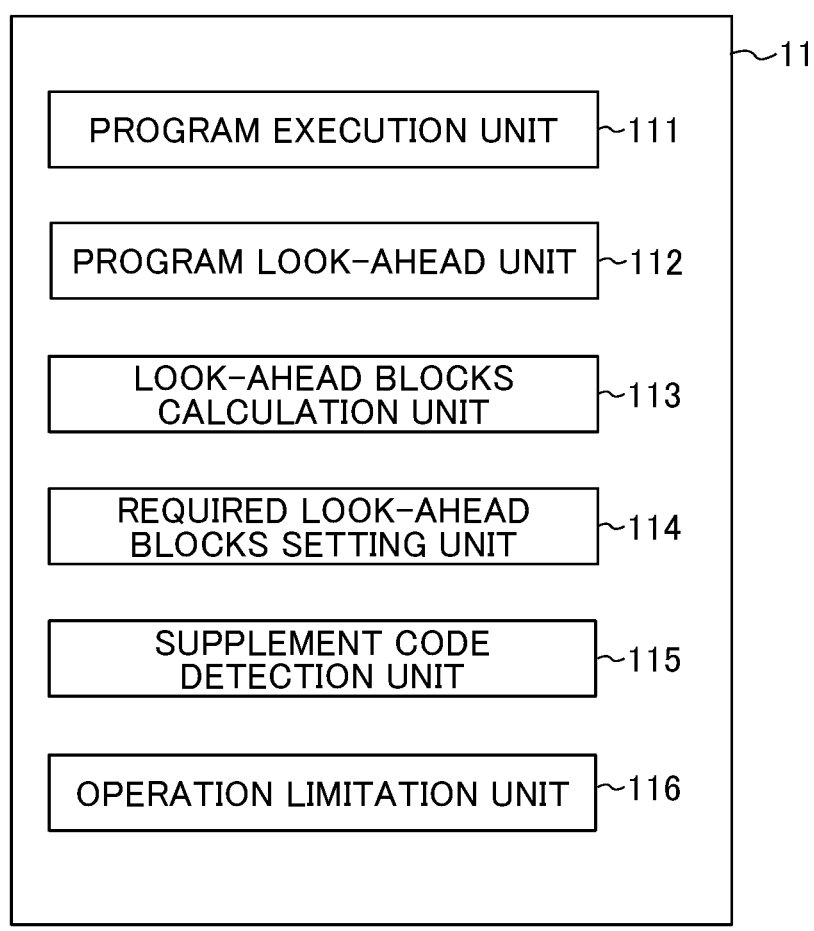
FIG. 3 is a diagram for illustrating function blocks for the numerical controller according to the embodiment of the present invention.

FIG. 3 is a function block diagram for illustrating a function where the CPU 11 reads out system programs and application programs stored in the ROM 12 via the bus 25 and implements the present invention according to those system programs and application programs.

The CPU 11 includes a program execution unit 111, a program look-ahead unit 112, a look-ahead blocks calculation unit 113, a required look-ahead blocks setting unit 114, a supplement code detection unit 115 and an operation limitation unit 116.

The program execution unit 111 executes a machining program.

More specifically, in this embodiment, the program execution unit 111 executes a simulation of the machining program. During this simulation, it is preferable, for example, that workpiece be placed on the machine tool 200 and the machine tool 200 be actually operated, instead of just executing the machining program idly.

This is because the difference in look-ahead blocks over time (to be described later) changes depending on the operating environment, and the axis configuration of the machine tool 200.

In parallel with the simulation of the machining program executed by the program execution unit 111, the program look-ahead unit 112 looks ahead at the machining program before the simulation is executed.

The look-ahead blocks calculation unit 113 calculates the look-ahead blocks. This number is the difference between a first sequence number of a block that is being executed by the program execution unit 111 and a second sequence number of a block that is looked ahead by the program look-ahead unit 112 at the time when the first block is being executed.

The required look-ahead blocks setting unit 114 sets a "required look-ahead blocks", which is the look-ahead blocks required to execute the machining program.

The required look-ahead blocks setting unit 114 may set a single "required look-ahead blocks" for one entire machining program or may set a "required look-ahead blocks" for each block that makes up a machining program, that is, each process of machining in a machining program.

The required look-ahead blocks setting unit 114 may also set the "required look-ahead blocks" on the basis of the maximum capacity of a memory in which the look-ahead blocks are stored and executed and consumed by the program execution unit 111.

The memory used in this case may be the above-described RAM 13 or may be a storage device such as a buffer that is externally mounted to the numerical controller 100.

Alternatively, the required look-ahead blocks setting unit 114 may set, when each machining program is executed, the "required look-ahead blocks" using a required look-ahead blocks that is stored in the memory.

For example, the numerical controller 100 may store a table for setting correspondence between an identifier for each machining program and the "required look-ahead blocks" set for each machining program. Then, the required look-ahead blocks setting unit 114 may read the "required look-ahead blocks" that corresponds to the machining program to be executed from the table.

Alternatively, as described later, a look-ahead block supplement code may be inserted into the machining program and a user may write this look-ahead block supplement code into the machining program together with a variable. Then, the required look-ahead blocks setting unit 114 may set the value set as the variable on the basis of input from an input device of the numerical controller 100 or a value read for the variable from another subroutine as the "required look-ahead blocks".

(In this embodiment, the "look-ahead block supplement code" is also referred to as a "first code".)

Alternatively, if the machining program contains an iteration of a code that corresponds to identical machining, the look-ahead blocks consumed when the program execution unit 111 executed the code previously may be stored in the memory as a "number of consumed blocks" and, when the code is executed next and for subsequent times, the required look-ahead blocks setting unit 114 may set a value in which the "number of consumed blocks" has been added to the look-ahead blocks before executing the code as the "required look-ahead blocks".

(In this embodiment, a code that corresponds to identical machining is also referred to as a "second code".)

The supplement code detection unit 115 detects the "look-ahead block supplement code" inserted into the machining program.

FIG. 4 illustrates an exemplary machining program that has been inserted with a "look-ahead block supplement code". In the example illustrated in FIG. 4, a code called "M400" is inserted into the machining program as the "look-ahead block supplement code".

In the machining program, the "look-ahead block supplement code" is inserted into a block at which a speed control abnormality is likely to occur when the machining program is executed due to a reduction in the look-ahead blocks.

When the "look-ahead block supplement code" is detected, the operation limitation unit 116 compares the look-ahead blocks at that time and the required look-ahead blocks and, if the look-ahead blocks is less than the "required look-ahead blocks", the operation limitation unit 116 limits execution of the machining program by the program execution unit 111 until the look-ahead blocks looked ahead by the program look-ahead unit 112 reaches the required look-ahead blocks.

For example, the operation limitation unit 116 may reduce the operation speed of the machine tool specified in the machining program as a limitation on the execution of the machining program.

With this configuration, the speed at which the program execution unit. 111 executes the machining program slows down and, during this time, the program look-ahead unit 112 continues to look ahead at the machining program to thereby supplement the look-ahead blocks.

Figure 5:
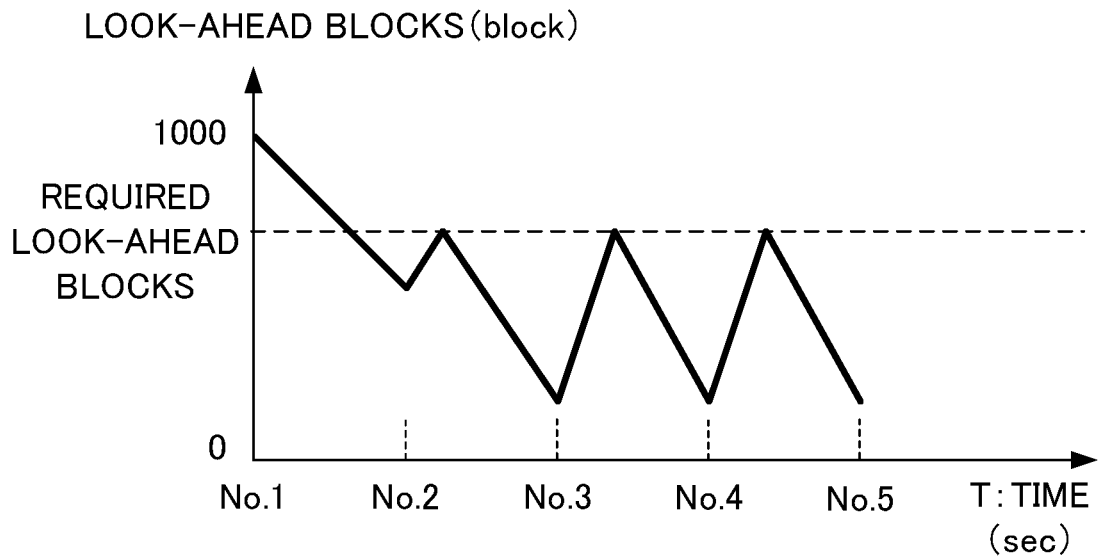
FIG. 5 is a graph for showing difference in the look-ahead blocks according to the embodiment of the present invention over time.

FIG. 5 is a graph for showing difference in the look-ahead blocks over time when the operation limitation unit 116 reduces the operation speed of the machine tool.

Figure 9:
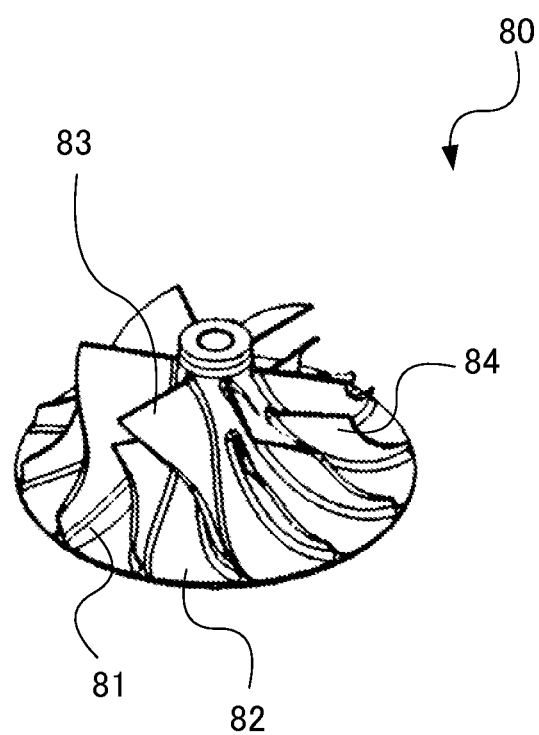
FIG. 9 is a diagram for illustrating an exemplary impeller configuration.
Figure 10:
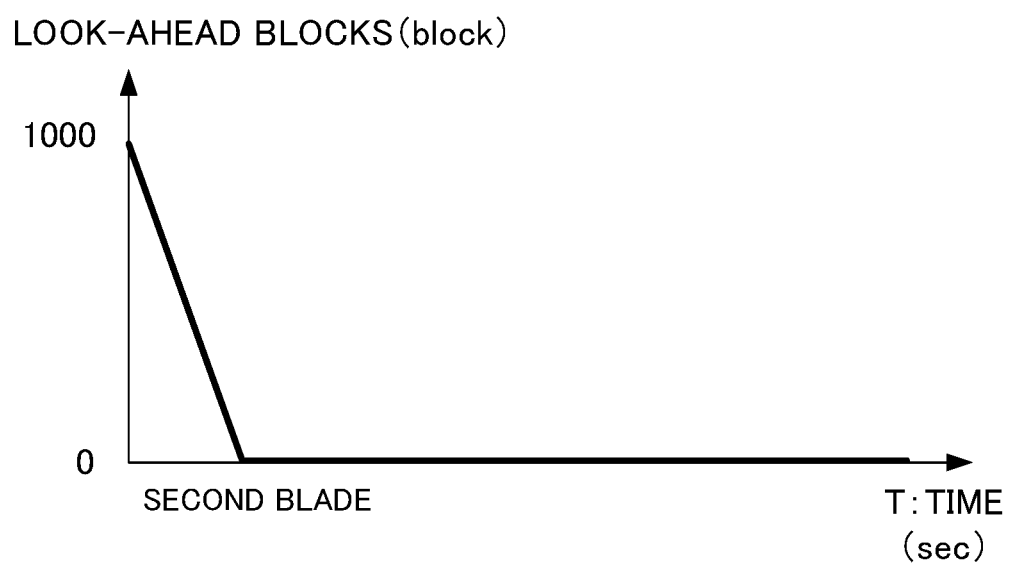
FIG. 10 is a graph for showing difference in the look-ahead blocks over time in the prior art.

Simultaneously with "No. 2", for example, when machining of the second blade of the impeller 80 in FIG. 9 starts, the operation speed of the machine tool 200 is reduced and the program look-ahead unit 112 looks ahead at the machining program. As a result, the look-ahead blocks increases and the graph shows growth.

After the look-ahead blocks reaches the required look-ahead blocks, the machine tool operates at a normal operation speed. Therefore, although the look-ahead blocks reduces, the look-ahead blocks does not become zero.

Simultaneously with "No. 3", for example, when machining of the third blade of the impeller 80 in FIG. 9 starts, the operation speed of the machine tool 200 is reduced again and the program look-ahead unit 112 looks ahead at the machining program. As a result, the look-ahead blocks increases again and the graph shows growth.

This increase and decrease in the look-ahead blocks repeats until the machining ends.

Alternatively, the operation limitation unit 116 may instruct the program execution unit 111 to stop executing the machining program as a limitation on the execution of the machining program.

While the machining program is stopped, the program look-ahead unit 112 continues to look ahead at the machining program, to thereby supplement the look-ahead blocks.

Figure 6:
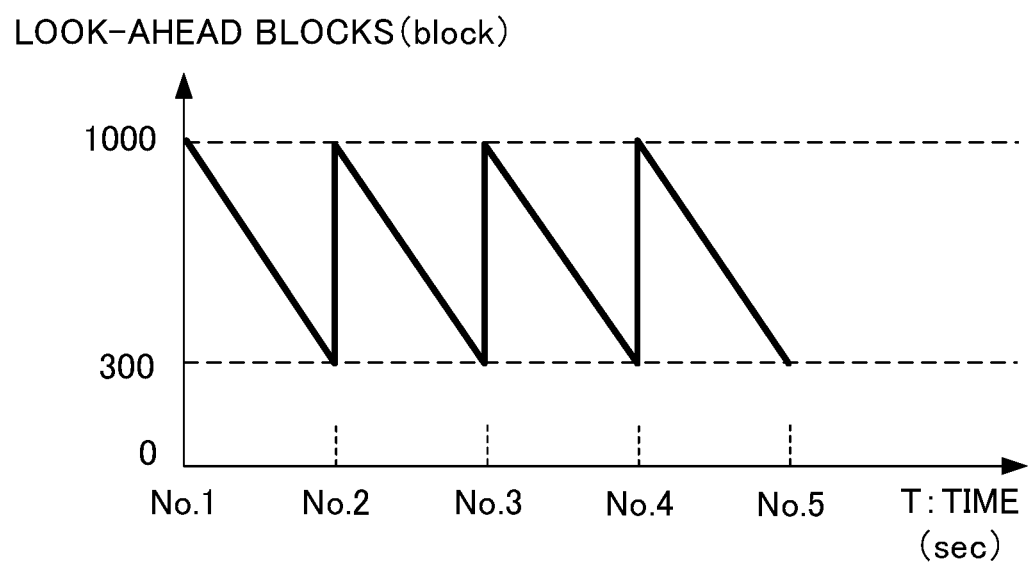
FIG. 6 is a graph for showing difference in the look-ahead blocks according to the embodiment of the present invention over time.

FIG. 6 is a graph for showing difference in the look-ahead blocks over time when the operation limitation unit 116 instructs the program execution unit 111 to stop executing the machining program.

Simultaneously with "No. 2", for example, when machining of the second blade of the impeller 80 in FIG. 9 starts, the program look-ahead unit 112 looks ahead at the machining program while execution of the machining is stopped. As a result, the look-ahead blocks increases vertically. After the look-ahead blocks reaches the required look-ahead blocks, the machine tool operates at a normal operation speed. Therefore, although the look-ahead blocks reduces, the look-ahead blocks does not become zero.

Simultaneously with "No. 3", for example, when machining of the third blade of the impeller 60 in FIG. 9 starts, the program look-ahead unit 112 looks ahead at the machining program while execution of the machining is stopped. As a result, the look-ahead blocks increases vertically. This increase and decrease in the look-ahead blocks repeats until the machining ends.

Through configuring the numerical controller 100 in this way, the operation speed of the machine tool is reduced and execution of the machining program is stopped at a block at which a speed control abnormality is expected to likely occur. During this time, the numerical controller 100 continues to look ahead at the machining program to supplement the look-ahead blocks. As a result, the required look-ahead blocks can be secured and the possibility of a speed control abnormality occurring can be reduced.

3. Operation of Invention

Figure 7:
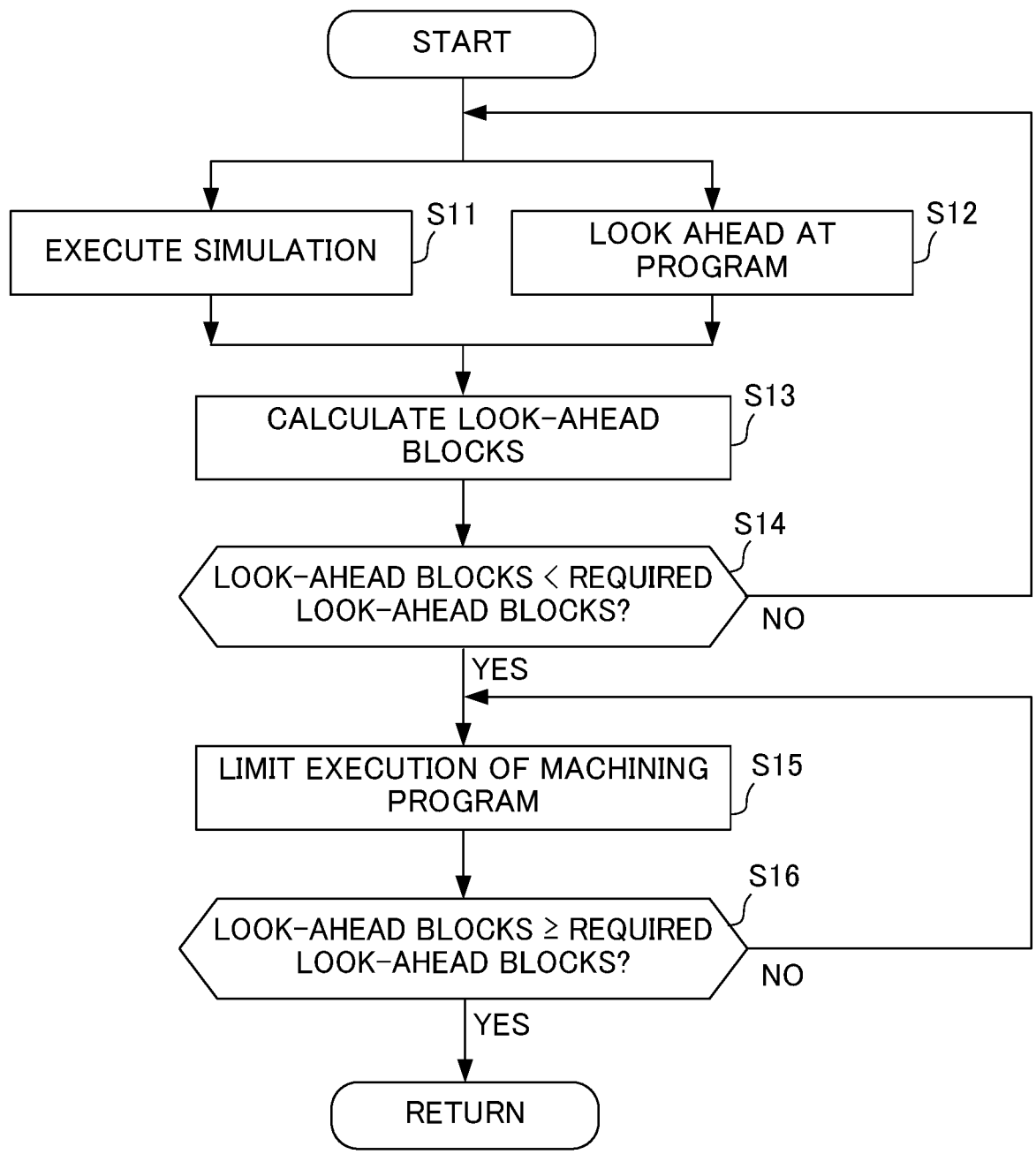
FIG. 7 is a flowchart for illustrating operation of the numerical controller according to the embodiment of the present invention.
Figure 8:
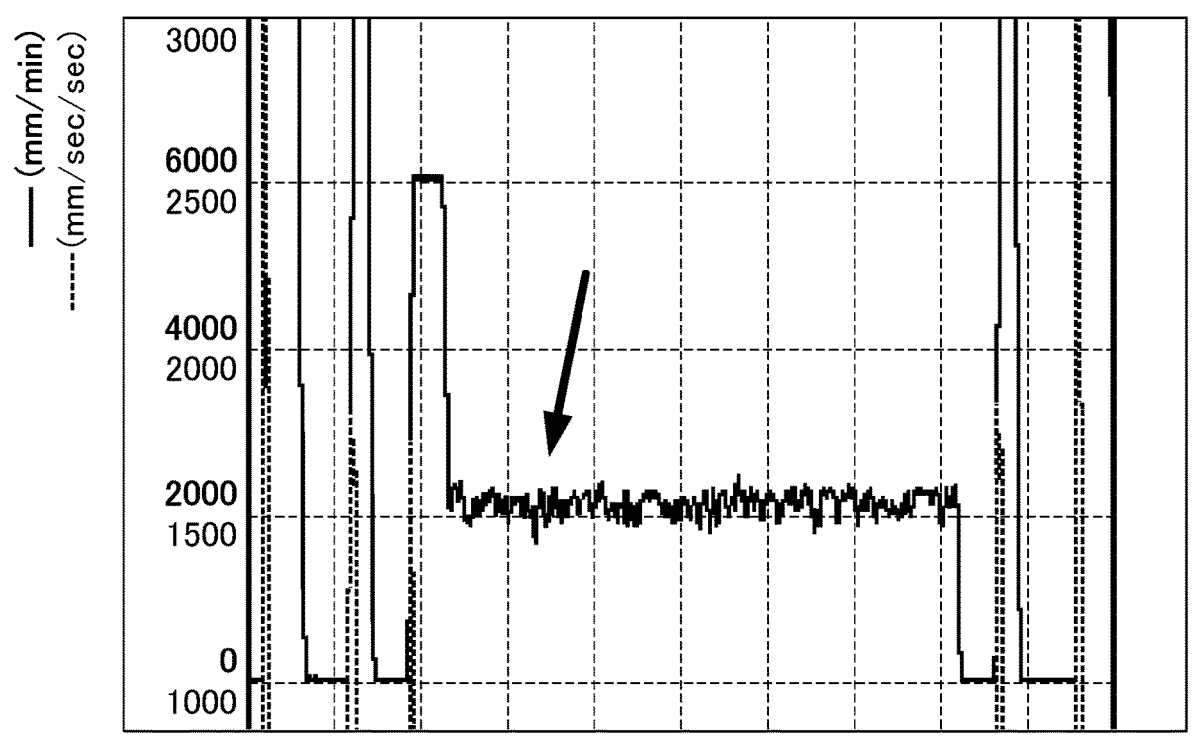
FIG. 8 is a graph for showing instability of speed due to inability to secure the look-ahead blocks.

Now, operation of the numerical controller 100 according to the first embodiment of the present invention is described with reference to FIG. 7.

In Step S11, the program execution unit 111 executes a simulation of the machining program.

In Step S12, in parallel with the machining program simulation executed by the program execution unit 111, the program look-ahead unit 112 looks ahead at the machining program before executing the simulation.

In Step S13, the look-ahead blocks calculation unit 113 calculates the look-ahead blocks.

In Step S14, if the look-ahead blocks falls below the required look-ahead blocks (S14: YES), the processing moves to Step S15.

If the look-ahead blocks is more than or equal to the required look-ahead blocks (S14: NO), the processing moves to Steps S11 and S12.

In Step S15, the operation limitation unit 116 limits execution of the machining program.

More specifically, the operation limitation unit 116 may be made to reduce the operation speed of the machine tool 200 specified in the machining program or may instruct the program execution unit 111 to stop executing the machining program.

In Step S16, the look-ahead blocks is more than or equal to the required look-ahead blocks (S16: YES), the processing moves to Steps S11 and S12 (return). If the look-ahead blocks is less than the required look-ahead blocks (S16: NO), the processing moves to Step S15.

4. Effects of the Embodiment

The numerical controller 100 according to the embodiment of the present invention includes the look-ahead blocks calculation unit 113 that calculates the look-ahead blocks, which is the difference between a first sequence number that is the number of a block in the machining program that is being executed and a second sequence number that is the number of a block that is looked ahead, the required look-ahead blocks setting unit 114 that sets a required look-ahead blocks, which is the look-ahead blocks required for executing the machining program, and the operation limitation unit 116 that compares the look-ahead blocks to the required look-ahead blocks and, if the look-ahead blocks is less than the required look-ahead blocks, limits execution of the machining program until the look-ahead blocks reaches the required look-ahead blocks.

With this configuration, it is possible to detect the position in the machining program at which a speed control abnormality is likely to occur due to an insufficient look-ahead blocks that are used to determine an acceleration/deceleration operation, and supplement the look-ahead blocks at that position in order to stabilize feed rate, cutting speed and other factors.

The numerical controller 100 also includes a storage unit that stores blocks to be looked ahead, where the stored blocks are consumed by executing the program. The required look-ahead blocks setting unit 114 sets the required look-ahead blocks on the basis of the maximum capacity of the storage unit.

As a result, the required look-ahead blocks can be set according to the capacity of the storage unit (for example, a buffer) that stores the look-ahead blocks, and the likelihood of the required look-ahead blocks being incorrect can be reduced.

The numerical controller 100 also includes a memory that stores the required look-ahead blocks, and the required look-ahead blocks setting unit 114 uses the required look-ahead blocks stored in the memory to set the required look-ahead blocks.

As a result, if, for example, a required look-ahead blocks needs to be set for each of a plurality of machining programs, management of the required look-ahead blocks can be made simple.

In the numerical controller 100, the required look-ahead blocks setting unit 114 sets the required look-ahead blocks on the basis of a variable that is written in the machining program together with the look-ahead block supplement code.

Using a variable to set the required look-ahead blocks makes it possible to freely change the required look-ahead blocks.

If the machining program contains an iteration of a code that corresponds to identical machining, the number of consumed blocks, which is the look-ahead blocks consumed when the code was previously executed, is stored and, when the code is executed next and for subsequent times, the required look-ahead blocks setting unit 114 sets the required look-ahead blocks by adding the number of consumed blocks to the look-ahead blocks before execution of the code.

As a result, if the same machining needs to be iterated such as in impeller machining, time-consuming procedures such as manually inputting the required look-ahead blocks for each process of machining can be avoided.

The operation limitation unit 116 reduces the operation speed of the machine tool 200 specified in the machining program as a limitation on the operation of the machine tool 200.

By reducing the operation speed of the machine tool 200 and having the program look-ahead unit 112 look ahead at the machining program while operation speed is reduced, it is possible to supplement the look-ahead blocks.

The operation limitation unit 116 also instructs the program execution unit 111 to stop executing the machining program as a limitation on the operation of the machine tool 200.

Through stopping execution of the machining program and having the program execution unit 112 look ahead at the machining program while the machining program is stopped, it is possible to supplement the look-ahead blocks.

5. Modification Examples

5.1 Modification Example 1

In the above-described example, the operation limitation unit 116 compares the look-ahead blocks to the required look-ahead blocks to detect a block at which a speed control abnormality is likely to occur, and supplements the look-ahead blocks at that block. However, the operation limitation unit 116 is not limited to this configuration.

For example, the operation limitation unit 116 may supplement the look-ahead blocks when the rate of reduction of the look-ahead blocks exceeds a prescribed value.

5.2 Modification Example 2

In the above-described embodiment, the look-ahead block supplement code is inserted into the machining program, but the present invention is not limited to this configuration. For example, the numerical controller 100 may include a "supplement code addition unit" that detects the position of an "exhaustion block" at which the look-ahead blocks falls below a prescribed value when the first simulation is executed, and that automatically inserts the look-ahead block supplement code into the exhaustion block.

(In this embodiment, the "look-ahead block supplement code" that is inserted by the supplement code addition unit is also referred to as a "third code".)

An embodiment of the present invention has been described above, but the present invention is not limited to the above-described embodiment.

Any described effects are merely the best effects achieved by the present invention and the effects achieved by the present invention are not limited to the description provided herein.

The control method used by the numerical controller 100 is implemented by software.

When using software, the programs that constitute said software are installed on a computer (numerical controller 100).

These programs may be recorded on a removable medium and distributed to a user or may be made available as a file to be downloaded to a user's computer via a network.

These programs may also be provided to a user's computer (numerical controller 100) as an Internet service via a network, instead of being downloaded.

EXPLANATION OF REFERENCE NUMERALS

10 control system
100 numerical controller
111 program execution unit
112 program look-ahead unit
113 look-ahead blocks calculation unit
114 required look-ahead blocks setting unit
115 supplement code detection unit
116 operation limitation unit
200 machine tool

What is claimed is:

1. A numerical controller for controlling a machine tool that has axes by executing a machining program that is made up of a plurality of blocks and controls acceleration/deceleration of the axes, the numerical controller comprising:
   a program execution unit that executes the machining program;
   a program look-ahead unit that looks ahead at the machining program in parallel with execution of the machining program;
   a look-ahead blocks calculation unit that calculates a look-ahead blocks, which is the difference between a first sequence number that is the number of a block being executed by the program execution unit and a second sequence number that is the number of a block that is looked ahead by the program look-ahead unit while the machining program is being executed;
   a required look-ahead blocks setting unit that sets a required look-ahead blocks, which is the look-ahead blocks required to execute the machining program; and
   an operation limitation unit that compares the look-ahead blocks calculated by the look-ahead blocks calculation unit and the required look-ahead blocks and, if the look-ahead blocks is less than the required look-ahead blocks, limits execution of the machining program by the program execution unit until the look-ahead blocks reaches the required look-ahead blocks.

2. The numerical controller according to claim 1, further comprising a storage unit that stores blocks that are looked ahead by the program look-ahead unit, where the stored blocks are consumed by the program execution unit,
   wherein the required look-ahead blocks setting unit sets the required look-ahead blocks on the basis of maximum capacity of the storage unit.

3. The numerical controller according to claim 1, further comprising a storage unit that stores the required look-ahead blocks,
   wherein the required look-ahead blocks setting unit sets the required look-ahead blocks using the required look-ahead blocks stored the storage unit.

4. The numerical controller according to claim 1, wherein the required look-ahead blocks setting unit sets the required look-ahead blocks on the basis of a variable that is written in the machining program together with a predetermined first code.

5. The numerical controller according to claim 1,
   wherein, the machining program contains an iteration of a second code that corresponds to identical machining,
   the numerical controller further comprising a storage unit that stores a number of consumed blocks that is the look-ahead blocks consumed when the second code was previously executed by the program execution unit, and
   the required look-ahead blocks setting unit setting, as the required look-ahead blocks, a value in which the number of consumed blocks is added to the look-ahead blocks before the code is executed when the code is executed next or for subsequent times by the program execution unit.

6. The numerical controller according to claim 1, wherein the operation limitation unit instructs the program execution unit to stop executing the machining program.

7. The numerical controller according to claim 1, wherein the operation limitation unit reduces operation speed of the machine tool specified in the machining program.

8. The numerical controller according to claim 1, further comprising a supplement code addition unit that detects a block in the machining program at which the look-ahead blocks calculated by the look-ahead blocks calculation unit falls below a prescribed value when a simulation of the machining program is executed, and inserts a predetermined third code in the block,
    wherein, when the third code is detected, the operation limitation unit compares the look-ahead blocks and the required look-ahead blocks.

* * * * *